United States Patent [19]

Broyhill

[11] Patent Number: 5,431,341

[45] Date of Patent: *Jul. 11, 1995

[54] DRIFT CONTROL ENCLOSURE FOR AN AGRICULTURAL SPRAYER

[75] Inventor: Craig G. Broyhill, Dakota City, Nebr.

[73] Assignee: The Broyhill Co., Dakota City, Nebr.

[*] Notice: The portion of the term of this patent subsequent to May 10, 2011 has been disclaimed.

[21] Appl. No.: 259,033

[22] Filed: Jun. 10, 1994

Related U.S. Application Data

[63] Continuation of Ser. No. 154,758, Nov. 18, 1993, Pat. No. 5,361,992, which is a continuation-in-part of Ser. No. 983,879, Dec. 1, 1992, Pat. No. 5,310,116.

[51] Int. Cl.⁶ .............................................. B05B 1/28
[52] U.S. Cl. .................................... 239/74; 239/172; 239/104
[58] Field of Search .............. 239/104, 288, 288.3, 239/288.5, 172, 754, 71, 74

[56] References Cited

U.S. PATENT DOCUMENTS

| | | | |
|---|---|---|---|
| 1,927,495 | 9/1933 | Hilgerink | 299/84 |
| 2,509,627 | 5/1950 | Bickerton et al. | 111/7 |
| 2,581,678 | 1/1952 | Malin et al. | 299/47 |
| 2,678,624 | 5/1954 | Grise et al. | 116/117 |
| 3,829,019 | 8/1974 | Petsch | 239/251 |
| 4,192,462 | 3/1980 | Erickson | 239/288 |
| 4,274,589 | 6/1981 | Jones | 239/167 |
| 4,641,781 | 2/1987 | McCrea et al. | 239/159 |
| 4,646,971 | 3/1987 | Rogers | 239/66 |
| 5,228,621 | 7/1993 | Wilson et al. | 239/288 X |
| 5,310,116 | 5/1994 | Broyhill | 239/172 |

FOREIGN PATENT DOCUMENTS

| | | | |
|---|---|---|---|
| 546395 | 9/1957 | Canada . | |
| 2450057 | 10/1980 | France . | |
| 2608944 | 7/1988 | France . | |
| 707301 | 4/1954 | United Kingdom | 239/288 |

Primary Examiner—Andres Kashnikow
Assistant Examiner—Kevin P. Weldon
Attorney, Agent, or Firm—Zarley, McKee, Thomte, Voorhees & Sease; Dennis L. Thomte

[57] ABSTRACT

A drift control enclosure for an agricultural sprayer comprising a plurality of elongated flexible filaments which extend downwardly from the spray bar of the sprayer towards the ground in an enclosure fashion so as to enclose the spray nozzles and the spray pattern thereof to prevent spray drift. The flexible filaments can separate to permit an obstruction to pass therethrough and can deflect to permit an obstruction to pass thereunder.

5 Claims, 4 Drawing Sheets

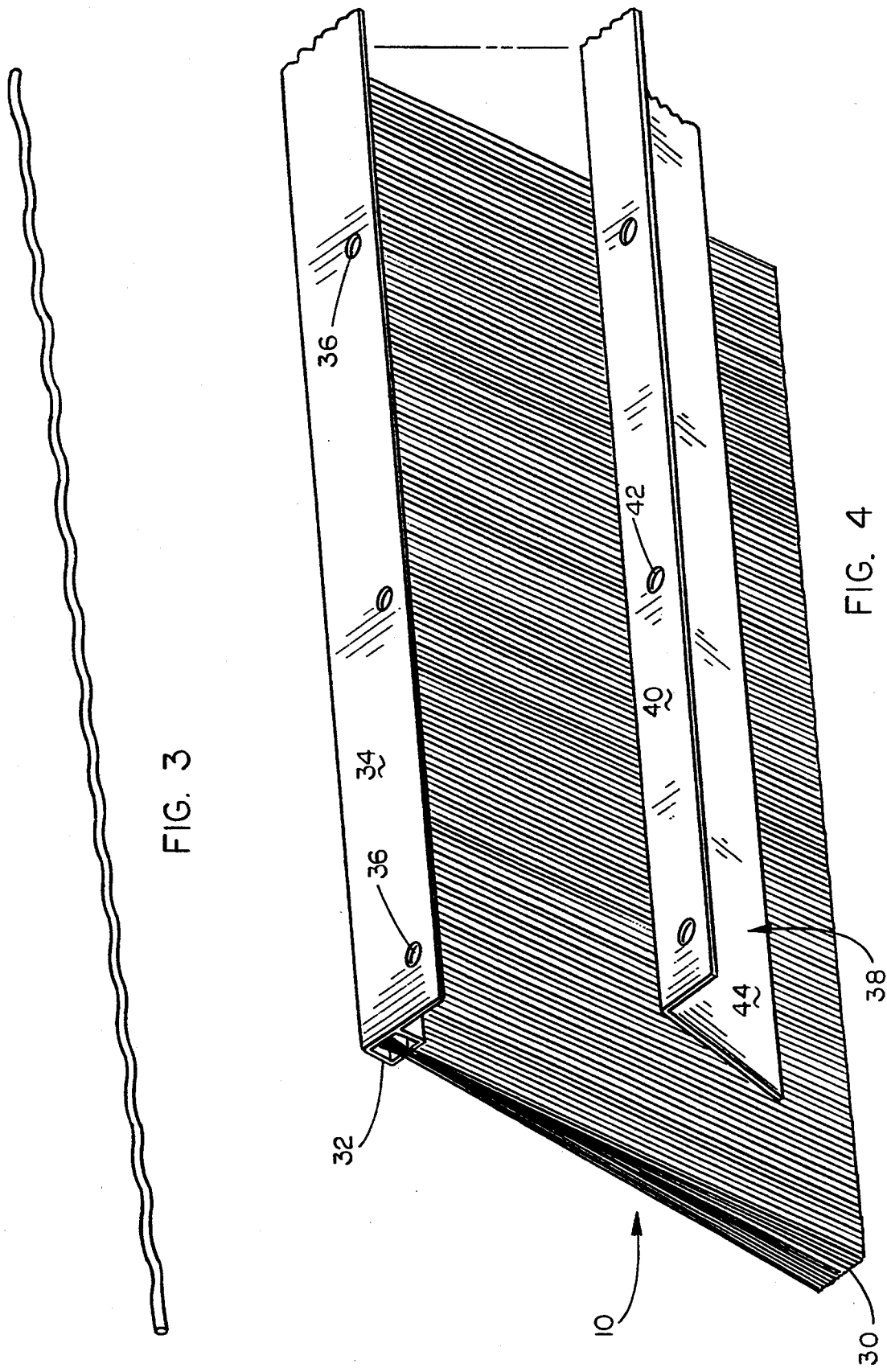

DRIFT CONTROL ENCLOSURE FOR AN AGRICULTURAL SPRAYER

CROSS REFERENCE TO RELATED APPLICATION

This is a continuation application of application Ser. No. 08/154,758, filed Nov. 18, 1993, now U.S. Pat. No. 5,361,942 which is a continuation-in-part application of application Ser. No. 07/983,879 entitled "A DRIFT CONTROL ENCLOSURE FOR AN AGRICULTURAL SPRAYER", filed Dec. 1, 1992, now U.S. Pat. No. 5,310,116.

BACKGROUND OF THE INVENTION

This invention relates to an agricultural sprayer and more particularly to an enclosure which prevents spray drift.

Agricultural or field sprayers are widely used to spray fields, golf courses, etc. The conventional sprayers normally include an elongated spray boom which extends transversely with respect to the direction of travel of the sprayer which may be mounted on a tractor, truck or wheeled trailer. A plurality of spray nozzles are normally located beneath the spray boom and spray the liquid chemical downwardly onto the ground, crop or turf. During windy conditions, the sprayed chemicals tend to drift which not only decreases the efficiency of the spraying operation but which also creates a serious environmental hazard.

Many attempts have been made to prevent spray drift. For example, U.S. Pat. No. 4,646,971 discloses an enclosure which is designed to prevent spray drift. However, the device of the '971 patent is believed to be quite expensive to manufacture and it is believed to be subject to structural damage should the front wall of the enclosure strike an obstruction such as a rock, tree stump, etc.

Thus, it is the principal object of the invention to provide an improved drift control enclosure for an agricultural sprayer.

A further object of the invention is to provide a drift control enclosure for an elongated spray boom which is comprised of a plurality of elongated flexible filaments which extend downwardly from the spray bar so as to enclose the spray nozzles and the spray pattern thereof to prevent spray drift.

Yet another object of the invention is to provide a drift control enclosure for an elongated spray boom which is adjustable to compensate for various sprayers and spray nozzle patterns.

Yet another object of the invention is to provide a drift control enclosure for an agricultural sprayer which has a transparent top to enable the operator to view the spray pattern. Still another object of the invention is to provide a drift control enclosure which includes a plurality of elongated flexible filaments or whiskers which permit obstructions to pass therethrough without causing damage to the enclosure.

Still another object of the invention is to provide a drift control enclosure for an agricultural sprayer which is impervious to the chemicals being sprayed.

Still another object of the invention is to provide a drift control enclosure for an agricultural sprayer which is economical of manufacture and durable in use.

These and other objects of the present invention will be apparent to those skilled in the art.

BRIEF DESCRIPTION OF THE DRAWINGS

FIG. 3 is a perspective view of one of the filaments of the enclosure;

FIG. 4 is a perspective view of a portion of the enclosure;

SUMMARY OF THE INVENTION

Figure 1:
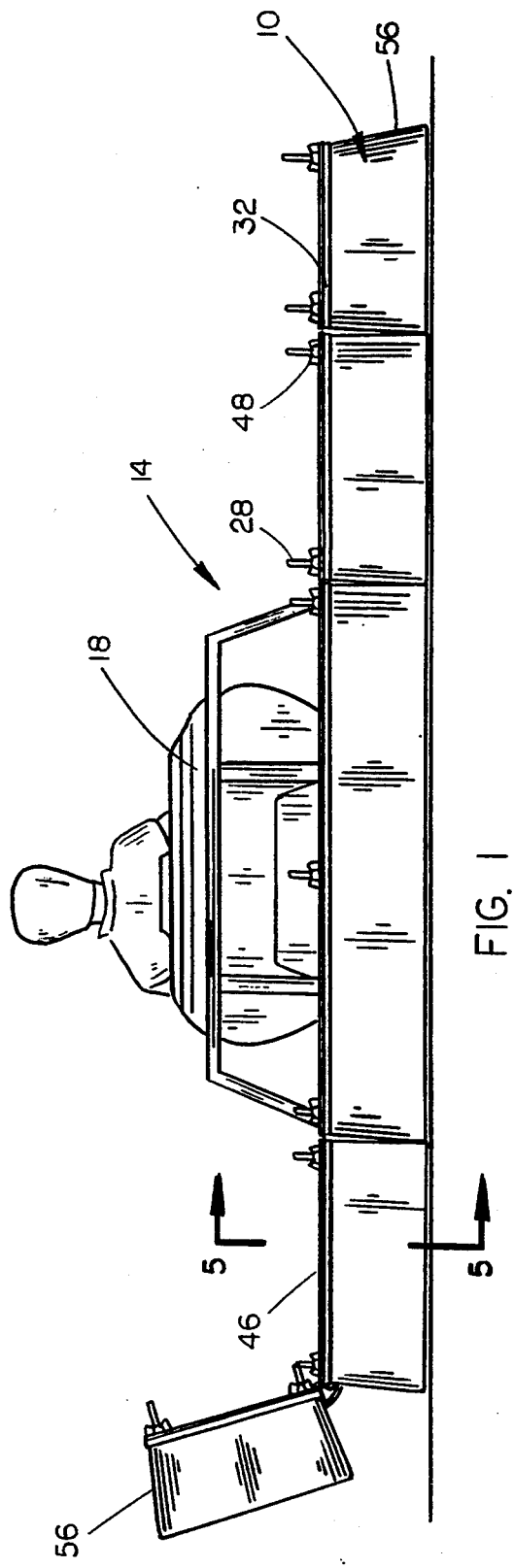
FIG. 1 is a rear view of an agricultural sprayer having the drift control enclosure mounted thereon.
Figure 2:
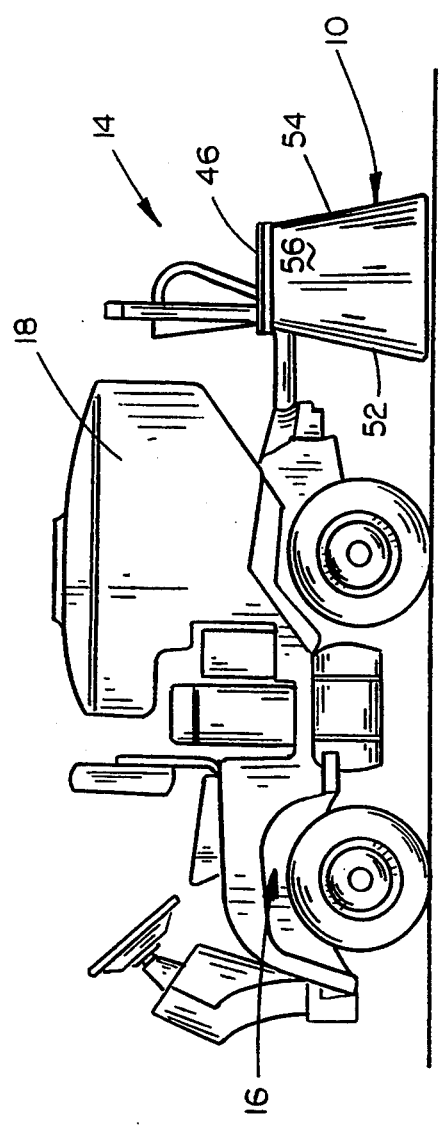
FIG. 2 is a side view of an agricultural sprayer having the drift control enclosure of this invention mounted thereon.

A drift control enclosure is described for use with a conventional agricultural sprayer having an elongated spray boom with a plurality of spray nozzles mounted thereon which are spaced above the ground and which are adapted to spray liquid chemicals or the like downwardly therefrom towards the ground. The enclosure is comprised of an elongated strip of flexible filaments which extend downwardly from the spray bar towards the ground in an enclosure fashion so as to enclose the spray nozzles and the spray pattern thereof to prevent spray drift. The front portion of the elongated strip extends downwardly and forwardly from the spray boom while the rear portion of the elongated strip extends downwardly and rearwardly from the spray boom. As the sprayer is moved across the area to be sprayed, the chemical spray from the nozzles is sprayed onto the crop, ground or turf and cannot drift in windy conditions since the filaments prevent the same. The flexible nature of the filaments permit the filaments or whiskers to deflect to permit an obstruction such as a rock, tree stump, etc. to pass therethrough.

DESCRIPTION OF THE PREFERRED EMBODIMENT

Referring now to the drawings, the drift control enclosure of this invention is generally designated by the reference numeral 10 and is designed to be mounted in association with a spray boom 12 of an agricultural or field sprayer 14. The drawings illustrate the sprayer 14 being mounted at the rear of a small vehicle 16 but the same may be mounted on a suitable trailer, truck, tractor or the like if so desired.

Figure 5:
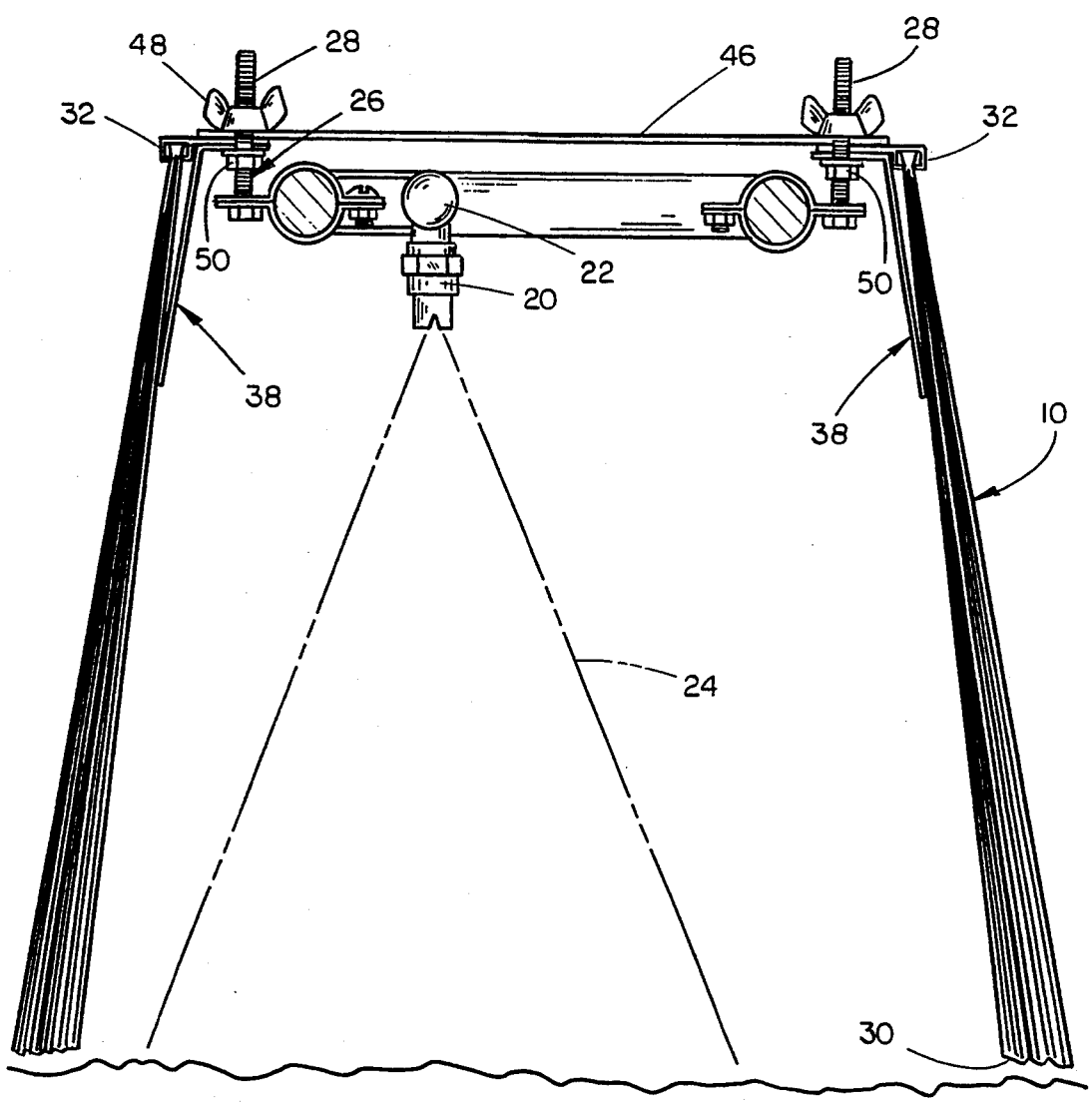
FIG. 5 is a sectional view of the enclosure.
Figure 6:
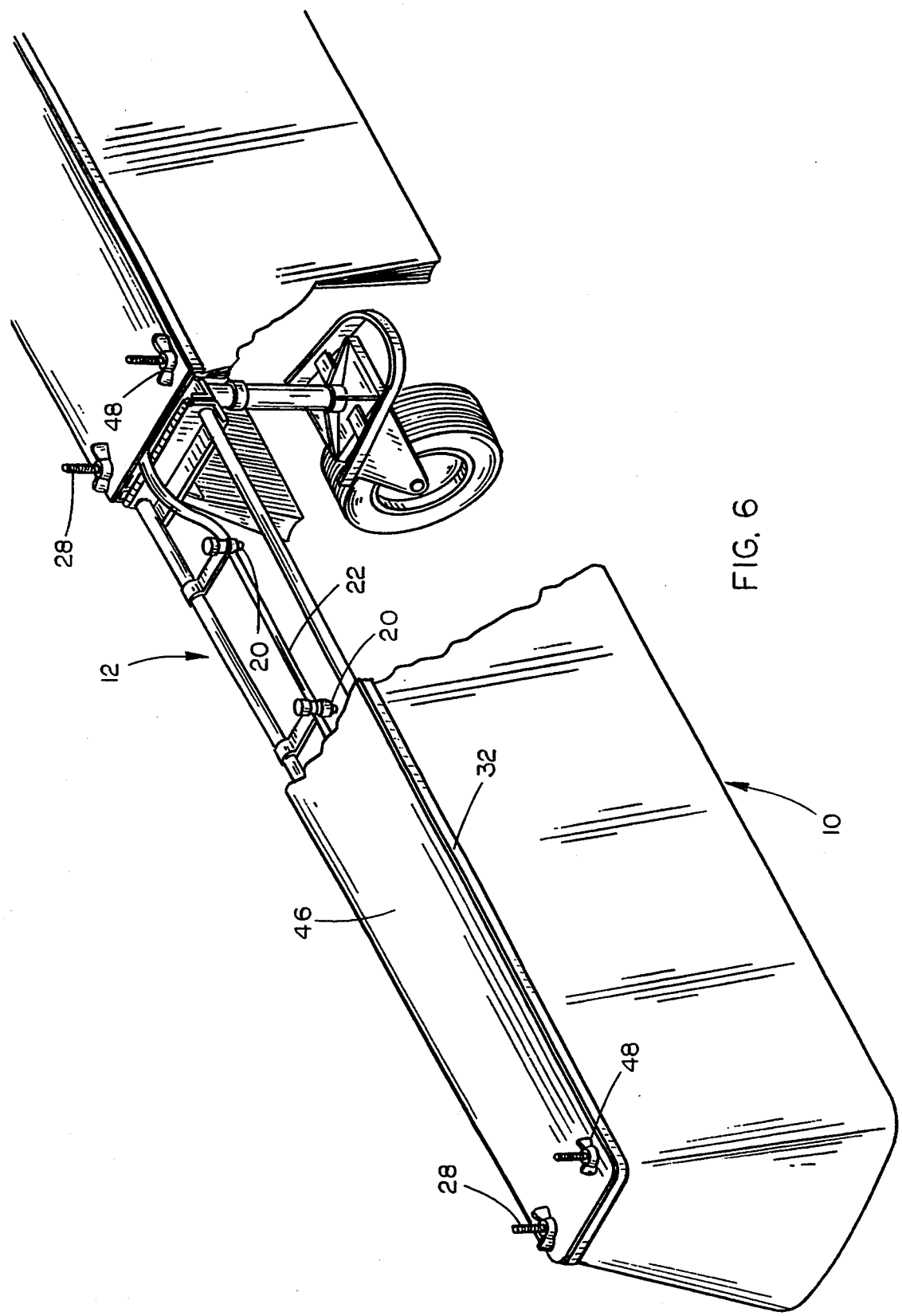
FIG. 6 is a partial front perspective view of the enclosure with portions thereof cut away to more fully illustrate the invention.

A spray tank 18 is mounted on the vehicle 16 and would include a pump for pumping liquid chemicals from the spray tank to the nozzles 20. Spray nozzles 20 are in communication with conduit 22 which is supported on the boom 12 in conventional fashion. FIG. 5 illustrates the spray pattern 24 as being wedge or conical shaped and it should be understood that the nozzles 20 may have various spray patterns. In any event, regardless of the particular spray pattern, the width of the spray pattern 24 will normally be greater at the lower end thereof. Although the enclosure 10 will work satisfactorily on a continuous and uninterrupted spray boom which extends across the entire rearward end of the sprayer, enclosure 10 is especially well suited for those sprayers wherein boom sections thereof may either be pivoted upwardly with respect to other boom sections as illustrated in FIG. 1 or boom sections which may break away rearwardly should the boom section strike an obstruction such as a fence post, telephone pole, etc.

Enclosure 10 includes a mounting bracket 26 which is removably secured to the boom 12 and which has a plurality of mounting bolts 28 secured thereto and extending upwardly therefrom. As seen in FIG. 4, enclosure 10 is comprised of a plurality of elongated flexible filaments or whiskers 30 which have their upper ends clamped into a stainless steel strip 32 including a horizontally extending portion 34 having a plurality of openings 36 formed therein which are received by the bolts 28. A stiffener plate 38 is provided as seen in the drawings and includes a top portion 40 having openings 42 formed therein and downwardly extending portion 44. Stiffener plate 38 is positioned so that the openings 42 are received by the bolts 28 with the top portion 34 of the drift 32 being placed thereon as best seen in FIG. 5. A transparent plate or cover 46 extends across the top of the enclosure as viewed in the drawings and is held in place by the wing nuts 48 on the bolts 28. Plate or cover 46 is transparent to enable the operator to view the spray pattern of the nozzles. Plate 46 and the enclosure 10 may be vertically moved on the bolts 28 by means of the adjustment nuts 50 on the bolts 28 to enable the enclosure to be vertically adjusted to compensate for a particular type of crop, turf, etc. being sprayed.

For purposes of description, the enclosure 10 will be described as having a front portion 52, rear portion 54, and opposite ends 56 and 58. The enclosure will be broken up into as many sections as there are boom sections to enable the individual boom sections to either pivot upwardly as illustrated in FIG. 1 or to permit the individual boom sections to break away rearwardly should the boom sections strike an obstruction such as a post, pole, etc. The stiffener plate 38 is preferably constructed of a 20 gauge steel material to add stiffening to the filaments or whiskers 30 for proper spray coverage. Preferably, the downwardly extending portion 44 of stiffener plate 38 will extend downwardly and forwardly at the forward portion of the enclosure, will extend downwardly and rearwardly at the rearward portion of the enclosure as illustrated in FIG. 5, and will extend downwardly and outwardly at the ends 56 and 58. The angle of the orientation of the filaments 30 may be easily changed by simply bending the downwardly extending portion 44 of the stiffener plate 38 as required.

The filaments 30 may be of any length depending upon the particular construction of the sprayer upon which the enclosure is mounted. Applicant has tested filaments having lengths of 13 to 20 inches. The filaments 30 are impervious to the liquid chemicals being sprayed since they are preferably constructed of polypropylene and may be obtained from the Industrial Brush Corporation, Post Office Box 2608, Pomona, Calif. 91769.

In operation, the enclosure 30 prevents the drift of spray during windy conditions. The flexible filaments 30 may brush along the crop, turf or ground as desired. The flexible nature of the filaments 30 permits the filaments to deflect so as not to cause damage to the turf or to the crop being sprayed. Further, the flexible nature of the filaments is such that obstructions such as rocks, stumps, etc. may pass therethrough without damaging the enclosure.

Thus it can be seen that the invention accomplishes at least all of its stated objectives.

I claim:

1. A drift control enclosure, having upper and lower ends, for an elongated spray boom having rearward and forward ends and having a plurality of spray nozzles mounted thereon which are spaced above the ground and which are adapted to spray liquid chemicals or the like downwardly therefrom towards the ground, comprising:
   - a plurality of elongated flexible filaments, having upper and lower ends extending downwardly from said spray boom towards the ground in an enclosure fashion so as to enclose the spray nozzles and the spray pattern thereof to prevent spray drift, the upper ends of said flexible filaments being positioned above said spray nozzles;
   - said flexible filaments being joined at their upper ends to form an elongated flexible strip including a front portion positioned forwardly of said spray boom, a rear portion of which is spaced rearwardly of said spray boom, and end portions which extend around the ends of said spray boom whereby said filaments in said strip normally enclose the spray nozzles but can deflect to permit an obstruction to pass thereunder or separate to permit an obstruction to pass therethrough.

2. A drift control enclosure, having upper and lower ends for an elongated spray boom having rearward and forward ends and having a plurality of spray nozzles mounted thereon which are spaced above the ground and which are adapted to spray liquid chemicals or the like downwardly therefrom towards the ground, comprising:
   - a plurality of elongated flexible filaments extending downwardly from said spray boom towards the ground in an enclosure fashion so as to enclose the spray nozzles and the spray pattern thereof to prevent spray drift, the upper ends of said flexible filaments being positioned above said spray nozzles;
   - said flexible filaments being joined at their upper ends to form an elongated flexible strip including a front portion positioned forwardly of said spray boom, a rear portion which is spaced rearwardly of said spray boom, and end portions which extend around the ends of said spray boom whereby said filaments in said strip normally enclose the spray nozzles but can deflect to permit an obstruction to pass thereunder or separate to permit an obstruction to pass therethrough;
   - said filaments being vertically adjustable;
   - and a transparent, horizontally disposed, plate means extending across the upper end of the enclosure to permit visual observation of the spray pattern of the nozzles.

3. The drift control enclosure of claim 1 wherein said front portion of said elongated strip extends downwardly and forwardly relative to said spray boom.

4. The drift control of claim 1 wherein said back portion of said elongated strip extends downwardly and rearwardly relative to said spray boom.

5. The drift control enclosure of claim 1 wherein said front portion of said elongated strip extends downwardly and forwardly relative to said spray boom and wherein said back portion of said elongated strip extends downwardly and rearwardly relative to said spray boom.

* * * * *